Feb. 29, 1972  D. JAMES  3,645,957
POLYAMIDES WITH A PIGMENT DISPERSED IN THE PRESENCE OF
DIETHANOLAMIDE AND DIETHANOLAMINE
Filed April 7, 1969

Inventor
DAVID JAMES
By
Cushman, Darby & Cushman
Attorneys 3,645,957
POLYAMIDES WITH A PIGMENT DISPERSED IN THE PRESENCE OF DIETHANOLAMIDE AND DIETHANOLAMINE
David James, Pontypool, England, assignor to Imperial Chemical Industries Limited, London, England
Filed Apr. 7, 1969, Ser. No. 813,997
Claims priority, application Great Britain, Apr. 10, 1968, 17,274/68
Int. Cl. C08g *51/02, 51/44*
U.S. Cl. 260—32.6 N   18 Claims

ABSTRACT OF THE DISCLOSURE

Polyamides having pigments dispersed therein in the presence of a diethanolamine and preferably in the presence of a diethanolamine and a diethanolamide.

---

Figure 1:
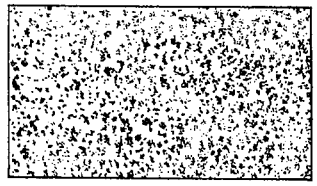
Figure 2:
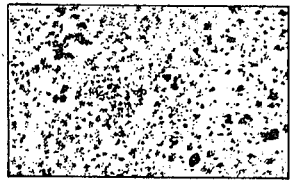
Figure 3:
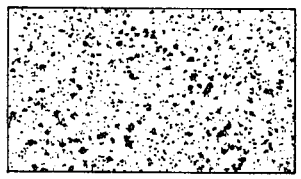
Figure 4:
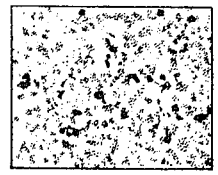
Figure 5:
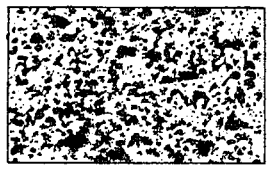
Figure 6:
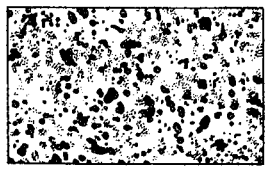

The present invention relates to polyamides. More particularly the invention relates to the dispersion of pigments in polyamides.

Reference to polyamides throughout this specification is to be interpreted as including synthetic homo- and copolyamides as fibres, films, rods, tapes and other structures which may be formed by one or more of the well-known techniques of melt extrusion, moulding or casting. Specifically there may be mentioned polyhexamethylene adipamide and polycaprolactam and copolyamides incorporating these components.

The expression "pigment" in the context of this invention is to be taken as including a substance in particulate form which may be applied to a body by incorporation to modify its colour and light scattering properties and in particular there may be mentioned titanium dioxide (anatase or rutile) and carbon black. Furthermore, the pigment particles themselves may be coated with substances that serve either to modify the properties of the pigment or the properties of the polyamide system in which the pigment is used.

Hitherto, the dispersion of pigments in polyamides has not always been satisfactory. Lack of compatibility either between the pigment and its carrier medium, the polyamide starting materials or the polyamide itself, or between the pigment and other additives that may be present in the system, has often led to undesirable pigment behaviour, which in turn has given rise to inefficient manufacture of the polyamide and/or inferior polyamides resulting from such a manufacture.

In practice, difficulties have manifest themselves in various ways, for example, settling out of titanium dioxide pigment may occur before or after its addition to a polyamide or its starting materials with consequent blocking or control valves and possibly even supply lines; in the extrusion of titanium dioxide pigmented polyamides, filters in spinning packs may become rapidly fouled or clogged by pigment particles, necessitating frequent changing of the filter and/or pack with consequent interruptions of the extrusion process; and in the case of spun polyamide yarn which is subsequently subjected to a drawing or stretching process, deposition of titanium dioxide pigment may be found to occur on parts of the drawing or stretching apparatus over which the yarn passes.

Thus, the problem of satisfactorily dispersing pigments and in particular titanium dioxide in polyamides may be divided into one or more of at least four parts.

(A) Preparing a stable and well dispersed aqueous or non-aqueous slurry of pigment prior to its incorporation into either the monomer starting materials, the monomer or polymer. (B) Maintaining the stability of the dispersion after its addition to either the monomer starting materials, the monomer or polymer and obtaining a good dispersion of the pigment in that medium. (C) Maintaining a stable and efficient dispersion of the pigment in the polymer until the polymer has been extruded and has solidified, and (D) preventing deposition of the pigment when pigment-containing yarn is subsequently subjected to processing operations.

Though in some instances there may be little or acceptable difficulty in dispersing pigments in polyamides when dealing with what may be essentially described as a two-component system, i.e. pigment and polyamide only, the problems associated with such dispersing operations may become much more acute when further components are present. Such is the case in the manufacture of fibre-forming polyamides as various "foreign" compounds are frequently added to the polyamide system in order to improve or influence its final properties. For example, in order to improve the oxidative stability of the subsequent polyamide, various phosphorous containing compounds may be added prior to or during the polymerisation stage of the manufacture of the polyamide. When pigments and "foreign" compounds are added they may be added together or separately, but in either case the presence of a multi-component system may have unforeseen detrimental effects on a pigment dispersion which may have otherwise been quite satisfactory. At the same time, any such system may be further complicated by the presence of pigment particles that carry single or multiple surface layers of additional modifying agents. For example, in the case of titanium dioxide, in order to improve the photo-stability of the final polyamide, the pigment particles may be pre-coated with a manganese salt.

Nevertheless, the applicants have found most unexpectedly that these and other problems may be substantially overcome by the use of specific pigment dispersing systems.

Accordingly, the present invention provides a synthetic polyamide composition containing pigment particles which are dispersed therein in the presence of a diethanolamide and diethanolamine.

The presence of a diethanolamide is not essential to the dispersive action of the diethanolamine, but is considered preferable.

The preferred diethanolamide is lauric diethanolamide although the length of the fatty acid chain is not thought to be very critical, e.g. coconut diethanolamide behaves in a similar manner.

The present invention also provides a process for dispersing pigment particles in a synthetic polyamide composition which comprises adding the particles to the monomer prior to its polymerisation in the presence of a diethanolamide and diethanolamine or diethanolamine alone.

Aqueous or non-aqueous pigment slurry and the diethanolamide and/or diethanolamine may be added in either order or in part at different stages of the whole reaction route. If the diethanolamide and/or diethanolamine is not added prior to the polymerisation of the amide, however, if is preferable to added it shortly after the polymerisation reaction has begun.

The total amount of dispersant added should be that which would result in the presence in the polyamide of a theoretical final quantity of not less than 0.05% by weight and preferably not more than 10% by weight with respect to the quantity of pigment present.

Though the presence of a diethanolamide and/or diethanolamine has been found to be especially effective in dispersing particles of such pigments as titanium dioxide, the value of the present invention may be enhanced if the diethanolamide and/or diethanolamine is present as a coating on the surface of the pigment particles rather than as a separate component.

Surprisingly, the applicants have found that the use of a diethanolamide and/or diethanolamine is quite specific and manifestly superior to other alkanolamides and alkanolamines. In particular the performance of diethanolamine unexpectedly bears little relation to that of triethanolamine as is clearly demonstrated by Example 5. In some instances it has been found advantageous to add the diethanolamide to the monomer or polymer prior to the addition of the diethanolamine dispersed pigment slurry.

The present invention is equally applicable to polyamides that are produced either by conventional batchwise techniques or else continuously and in particular to the dispersion of titanium dioxide pigment particles which have been pre-coated with a manganese salt or salts and are to be dispersed in the presence of a phosphorus-containing compound or compounds.

The latter advantage is of particular importance since the level of phosphorus present may thus be increased with concomitant anti-oxidant protection without the problems discussed above arising so quickly.

In the following examples which are intended only to illustrate the present invention and are to be considered in no way limiting, the parts and percentages are by weight. Where comparisons between the effectiveness of diethanolamine and Calgon (registered trademark) PT are made, quantities of 1% and 0.2% respectively (based on the titanium dioxide present) were chosen since they are believed to be those levels at which their effect is greatest.

EXAMPLE 1

In this example the efficiency of the transfer in a polyhexamethylene adipamide continuous polymerisation process of an aqueous titanium dioxide slurry, with respect to the concentration of titanium dioxide in the final polymer, was compared with (a) a titanium dioxide slurry dispersed with 1% diethanolamine based on the weight of titanium dioxide and (b) a titanium dioxide slurry dispersed with 0.2% of a conventional dispersant, namely Calgon (RTM) PT—a complex sodium polyphosphate. In the particular experiments a yarn titanium dioxide content of 2% was sought after.

The titanium dioxide particles were, in each case, pre-coated with a photo-stabilising manganese salt and the aqueous slurry injected into a continuous polymerisation unit during the early stages of polymerisation using a slurry pump with tungsten carbide non-return ball valves. Both the pump setting and the rate of polymer throughput were maintained constant throughout the trials. The percentage of titanium dioxide was determined in the extruded polymer at the commencement of the trials and then after 4 days and 8 days respectively.

| | Percent TiO₂ in extruded polymer | |
|---|---|---|
| Time during 8 day trial | Calgon PT dispersed | Diethanolamine dispersed |
| 0 | 1.87 | 1.93 |
| 4 | 1.78 | 2.04 |
| 8 | 1.63 | 1.85 |
| Mean | 1.76 | 1.94 |

As the results clearly indicate, diethanolamine as a titanium dioxide dispersant has been more effective than Calgon (RTM) PT with respect to the transfer efficiency of the pigment.

EXAMPLE 2

In the continuous polymerisation described in the previous example, aqueous titanium dioxide and dispersant containing slurry was continuously metered to the polymerisation coil via a slurry pump, where it was found that depending upon the efficiency of the pigment dispersion (measured by injection point life), the non-return ball valves of the pump eventually became fouled by deposited pigment particles, necessitating the dismantling and cleaning of the pump as follows:

Dispersant: Injection point life, hrs.
  Calgon PT 0.2% _____ 60–100
  Diethanolamine 1.0% _____ >200

EXAMPLE 3

In this example, continuously polymerised polyhexamethylene adipamide polymer containing a phenolic hypophosphite antioxidant system and 2% of the same titanium dioxide pigment that was used in the previous example, dispersed with 0.2% of Calgon (RTM) PT was extruded in the usual way into filaments using a conventional melt spinning pack.

A 13 filament yarn was spun at a speed of 3930 feet per minute corresponding to a polymer through-put of 8.3 pounds per hour and drawn at a 3.1 draw-ratio to a drawn denier of 40.

After 90 hours of spinning, however, the denier of the filaments had dropped below an acceptable value and on removal of the pack the polymer filters were found to be fouled by titanium dioxide pigment particles.

On repeating the same experiment but using 1% of diethanolamine as the dispersant, a pack life of 120 hours was achieved before the filament denier became unacceptable through pack fouling.

EXAMPLE 4

In this example three different polyhexamethylene adipamide polymers were prepared by conventional batchwise polymerisation techniques:

Polymer A—containing a phenolic hypophosphite antioxidant and 0.3% titanium dioxide (as used previously) dispersed with 0.5% of diethanolamine.

Polymer B—as for polymer A but containing 0.2% of Calgon (RTM) PT as dispersant in place of diethanolamine.

Polymer C—as for polymer A except that the titanium dioxide pigment was dispersed by ball-milling only in the prepolymer solution.

All three polymers were melt-spun as 20 filament yarn at 2,930 feet per minute and were subsequently drawn to 70 denier at 1,508 feet per minute at a draw ratio of 3.71.

Generally, the initial spinning performance of the three polymers was satisfactory, but on drawing, however, in the case of yarns spun from polymers B and C, titanium dioxide deposits on the drawn rolls of the drawtwister apparatus began to appear after about 30 minutes whereas yarns spun from polymer A gave no such deposits.

In the case of polyhexamethylene adipamide produced by continuous polymerisation, yarns containing the same phenolic hypophosphite antioxidant system and 2% titanium dioxide dispersed with 1% diethanolamine could be spun and drawn without deposition of titanium dioxide occurring, but equivalent yarns containing Calgon (RTM) PT (0.2%) dispersed titanium dioxide gave very heavy deposits of pigment on drawing.

EXAMPLE 5

The effectiveness of triethanolamine as a dispersant for pigment particles in a polyamide medium was compared with that of diethanolamine in the following manner.

Two different polyhexamethylene adipamide polymers were prepared:

Polymer A—containing a phenolic hypophosphite antioxidant (135 p.p.m. of phosphorus) and 2% of titanium dioxide pre-coated as described in Example 1 dispersed with 1% of diethanolamine.

Polymer B—as for polymer A but containing 1% of triethanolamine as dispersant in place of diethanolamine.

Both polymers were melt-spun under identical conditions with a through-put of 4.3 lbs. per hour and the increase in spinning pack pressure continuously metered.

After 120 hours of spinning, polymer A was still spinning satisfactorily. During this period pack pressure had risen slowly by about 20%.

In the case of polymer B, after only 30 hours of spinning the pack pressure rose sharply by 40% over a 15 hour period.

A working comparison of monoethanolamine against diethanolamine was even more distinguishing as would be expected by one skilled in and familiar with this art.

EXAMPLE 6

In this example a visible comparison of the effectiveness of the various dispersion systems of the present invention was made. A further comparison of these systems was also made against Calgon (RTM) PT and a salt of diethanolamine, namely diethanolamine citrate.

In each case the polyamide medium was polyhexamethylene adipamide containing 290 p.p.m. of phosphorus as hypophosphorous acid and the titanium dioxide particles that were used had a surface coating of manganese phosphate.

Referring to the accompanying microphotographs (×500 magnification):

| Figure | Alkanolamine coating on pigment | Free dispersant concentration (percent w./w. on pigment) |
|---|---|---|
| 1 | None | 5.0% lauric diethanolamide. 0.6% diethanolamine. |
| 2 | 0.72% diethanolamine | 0.3% diethanolamine. |
| 3 | 0.7% diethanolamine | None. |
| 4 | None | 0.5% diethanolamine citrate. |
| 5 | do | 1.0% diethanolamine. |
| 6 | do | 0.2% Calgon (RTM) PT. |

Thus, the order of efficiency of the various dispersion systems examined would appear to be:

lauric diethanolamide/diethanolamine>diethanolamine coated pigment>diethanolamine citrate, and diethanolamine>Calgon (RTM) PT.

Examples similar to 1–6 above and directed to the dispersion of pigments in polycaprolactam, were equally successful, though the advantages were not so marked as with polyhexamethylene adipamide.

EXAMPLE 7

The efficiency—by disc filtration analysis, of a dispersion system comprising Lissatan (RTM) AC and diethanolamine was compared with Lissatan AC alone, in dispersing particles of carbon black (10% w./w. aqueous slurry of Monarch (RTM) 81).

| Dispersing agent | Concentration of dispersing agent (percent w./w. on Monarch 81) | Time taken to produce a pressure drop of 200 lbs./sq. in. across a Grade B (5 micron) disc[1] |
|---|---|---|
| Lissatan AC | 4.5 | 14 minutes 45 secs. |
| Lissatan AC/ | 4.5–1.0 | 59 minutes 0 secs. |

[1] Pumping rate 50 cc./minute.

Clearly, the presence of diethanolamine has improved the degree of carbon black dispersion quite substantially.

I claim:

1. A synthetic polyamide composition containing pigment particles which are dispersed therein in the presence of from 0.05 percent to about 10 percent by weight, with respect to the quantity of pigment present, diethanolamine and a diethanolamide of a fatty acid, said diethanolamine having the ability to function as a dispersant for pigment particles in a polyamide medium.

2. A synthetic polyamide composition according to claim 1 in which the diethanolamide is lauric diethanolamide.

3. A synthetic polyamide composition containing pigment particles which are dispersed therein in the presence of from 0.05 percent to about 10 percent by weight, with respect to the quantity of pigment present, of diethanolamine, said diethanolamine having the ability to function as a dispersant for pigment particles in a polyamide medium.

4. A synthetic polyamide composition according to claim 3 in which the dispersant is present as a coating on the surface of the pigment particles.

5. A synthetic polyamide composition according to claim 3 in which the pigment is titanium dioxide.

6. A synthetic polyamide composition according to claim 5 in which the titanium dioxide pigment particles are coated with a manganese salt.

7. A synthetic polyamide composition according to claim 3 in which the polyamide is polyhexamethylene adipamide.

8. A synthetic polyamide composition according to claim 3 in which the composition contains a phosphorus-containing compound.

9. A process for dispersing pigment particles in a synthetic polyamide composition which comprises adding the pigment particles to the monomer prior to its polymerization in the presence of from 0.05 percent to about 10 percent by weight, with respect to the quantity of pigment present, of diethanolamine and a diethanolamide of a fatty acid, said diethanolamine having the ability to function as a dispersant for pigment particles in a polyamide medium.

10. A process according to claim 9 in which the diethanolamide is lauric diethanolamide.

11. A process for dispersing pigment particles in a synthetic polyamide composition which comprises adding the pigment particles to the monomer prior to its polymerization in the presence of from 0.05 percent to about 10 percent by weight, with respect to the quantity of pigment present, of diethanolamine, said diethanolamine having the ability to function as a dispersant for pigment particles in a polyamide medium.

12. A process according to claim 11 in which the dispersant is present as a coating on the surface of the pigment particles.

13. A process according to claim 11 in which the pigment is titanium dioxide.

14. A process according to claim 13 in which the titanium dioxide pigment particles are coated with a manganese salt.

15. A process according to claim 11 in which the pigment particles are added after the polymerization reaction has started.

16. A process according to claim 11 in which the polyamide is polyhexamethylene adipamide.

17. A process according to claim 11 in which the composition contains a phosphorus-containing compound.

18. A process according to claim 11 in which the polymerization reaction is continuous.

References Cited

UNITED STATES PATENTS

| | | | |
|---|---|---|---|
| 3,198,647 | 8/1965 | Kress | 106—308 |
| 3,215,663 | 11/1965 | Weisberg | 260—41 |
| 3,255,148 | 6/1966 | Sievenpiper | 260—37 |
| 3,344,107 | 9/1967 | Miller | 260—37 |

FOREIGN PATENTS

| | | | |
|---|---|---|---|
| 839,712 | 10/1958 | Canada | 260—37 |

MORRIS LIEBMAN, Primary Examiner

R. ZAITLEN, Assistant Examiner

U.S. Cl. X.R.

260—37 NP